Patented Sept. 19, 1933

1,927,123

UNITED STATES PATENT OFFICE 1,927,123

PROCESS OF TREATING CRUSTACEANS TO PREVENT COLORATION THEREIN

Donald W. Howe, Biloxi, Miss., assignor to Howe Packing Company, Inc., New Orleans, La., a corporation of Louisiana No Drawing. Application March 8, 1929
Serial No. 345,609

10 Claims. (Cl. 99—11)

The present invention relates to a process of treating edible crustaceans and the product resulting therefrom. More specifically, the invention relates to the production of uncolored crustaceans, and particularly crab meat. Proceeding in accordance with the present invention, coloration in the crustacean does not occur after what is known as the "processing step".

It has been proposed to can crustaceans but, as far as I am aware, this has not been particularly successful, and in the case of crab meat, it has not been possible to process the crab meat and, after canning, have it white and attractive in appearance.

As an example of the "processing step", as used in the canning trade, the process as applied to canned crab meat is as follows: the canned crab meat is generally treated with steam or boiling water for a certain period of time, for example, twenty minutes or more depending upon the size of container and temperature. Therefore, the term "processing", as used in the canning trade, denotes sufficient sterilization to prevent future spoilage due to bacterial action when the crab meat is canned.

Many crustaceans, after being sterilized by heat or the like, either immediately or in the course of time, go off color. In the case of crab meat, the crab meat turns blue-black or has gray streaks. As stated, most crustaceans have a tendency to form a coloration after sterilization, but in the case of crab meat, the coloration appears to be something more than a surface impregnation, and it is distributed through the crab meat. The coloration of crustaceans, and especially crab meat, produces an unsightly product, and this has been the chief factor in preventing its ready sale.

I have discovered that crustaceans, and especially crab meat, contain potential color constituents which, when they become activated, function to discolor the crustacean. In the case of crab meat, I have discovered that it is only after the "processing step" that the color-forming constituents become activated and function to form black, blue-black or gray colorations or streaks in the crab meat. While of course I do not desire to be limited as to the theory of my present invention, my research investigations indicate that the coloration of crustaceans is due chiefly to the presence of potential coloring constituents or the elements thereof in the crustacean. In the case of crab meat, it appears that chemical compounds, including the iron containing compounds, are chiefly responsible for the formation of the blue-black discoloration of the processed crab meat. It is known that crabs contain, in addition to other elements, small amounts of sulphur and iron. It appears that these elements do not exist in the crab meat in the form of naturally occurring iron sulphide. However, after the crabs have been processed in the containers, it appears that the potential iron compounds become activated, and in particular there is formed iron sulphide, which produces the undesirable blue-black coloration. Usually this blue-black coloration in the crab meat does not appear immediately, but only after a lapse of a few days.

I have also ascertained that the elimination of crustaceans, and particularly crab meat, from contact and contamination with iron or iron compounds, reduces the tendency of the crustacean or crab meat to be discolored. Crab picking establishments are more or less careless in the type of utensils used in picking crab meat, and rusty knives and containers for holding the crustacean or crab meat are frequently used. However, I have ascertained that by using stainless steel knives and containers of aluminum or glass, the tendency of the crustacean or crab meat to be discolored when processed is reduced, but is not eliminated. In other words, by proper precautions, the amount of color forming constituents in the crab meat can be substantially reduced to that naturally occurring.

Broadly stated, the present invention comprises substantially eliminating the formation of color in crustaceans, particularly in crab meat, by removing the color-forming ingredients, preferably, but not necessarily, prior to the processing step. In its preferred form, hazards are reduced to a minimum, control of the process is simplified, and a more uniform product is produced by initially removing a portion of the color-forming constituents and then removing, or rendering inert, the remainder of the color-forming constituents.

Relative to the product, there is produced in accordance with the present invention, a permanently uncolored or white crustacean or, stated differently, a crustacean, and particularly crab meat which, after sterilization and on canning, remains substantially permanently white. In other words, there is produced crab meat from which the potential color-forming constituents causing the crab meat to go off color have been substantially removed or rendered inert.

In the more specific aspect of the invention, crustaceans and particularly crab meat, are treated with a relatively strong color-removing solution to extract a substantial proportion of the color-forming ingredients. This solution, while of sufficient strength to function, does not materially affect the flavor of the crab meat. Under some circumstances, the process may be stopped at this point, and the crustacean canned. However, it preferred to employ a two-stage process, and treat the crustacean after extraction with the strong solution with a weaker solution to substantially complete the extraction of the color-forming ingredients or render them inert, thereby facilitating and aiding in the production of a crustacean, particularly crab meat, with the proper flavor.

It may be stated that the flavor of the finished crab meat is of paramount importance, as it is necessary that it have its natural flavor substantially unimpaired. Any process in which the natural flavor of the crab meat is materially altered, of course defeats the purpose of the process, as the crab meat is commercially unsalable. Further, it is desirable that the texture of the crab meat or other crustacean should not be softened to any material degree. In other words, the crab meat should remain firm.

The present invention obtains results compatible with the inherent limitations of the material being treated, and the properties which the finished crab meat must possess in order to be a commercial product.

The above sets forth broadly the methods which may be used to produce a crustacean which, on canning, after a processing step, is white and remains white for indefinite periods. In other words, there is produced a substantially permanent white crustacean, and it remains so while in the can or container. Various chemicals and specific methods of procedure may be employed to produce a substantially permanent uncolored crustacean. Organic compounds or inorganic compounds may be used to treat the crustacean. As an example of organic compounds, I may use weak acids, weak organic salts, sugars, hydrocarbon oils, vegetable oils, and organic oxidizing agents. As an example of inorganic compounds, I may use acids such as phosphoric acid, inorganic salts, and oxidizing agents. These compounds may be used by themselves or in combination, depending on the circumstances.

The following organic acids, when used either in combination or by themselves, have given satisfactory results: citric acid, tartaric acid, malic acid, acetic acid, and lactic acid.

A specific example of the process for the treatment of crab meat is as follows: a stock solution is made up, consisting of one gallon of water, one ounce of citric acid, and 4 ounces of salt. About ten pounds of crab meat is soaked in this solution, or as it is termed a brine, preferably warm or hot, for about twenty minutes. The brine is then drained from the crab meat until the latter is free from liquid, and thereafter placed in glass jars or tin cans and covered with another solution or brine made from one gallon of water, one-half ounce citric acid, and 4 ounces of salt. This second solution or brine is preferably added to the crab meat at a boiling temperature. The crab meat is then processed in the brine for about twenty minutes at 240° F. Preferably, the crab meat is cooled quickly after processing. It may be stated that the higher the temperature of processing, and the longer the crab meat is held in a hot condition, the greater the tendency to form the blue-black coloration.

It will be noted that the first stock solution contains one ounce citric acid, and the second stock solution contains one-half ounce of citric acid. The first solution extracts a greater proportion, or all but a trace of the color-forming compounds and particularly the iron and sulphur forming compounds, and the second stock solution or brine functions to hold or render inert the trace of the remaining potential color-forming constituents, thereby preventing the formation of iron sulphide.

Crabs coming from different localities, of course, contain different amounts of color-forming constitutents, and their physical and chemical characteristics are different. In some cases, a single brine soak may be used, for example, the first stock solution, and the crab meat thereafter put in cans with a portion of this brine. However, it may be stated, that in most cases this entails an increase of acid which may materially affect the flavor of the crab. It is because of the above, and because it does not always prevent the discoloration, that it is preferred to eliminate hazards, simplify control and secure a more uniform product by using a two-step process in which the crab meat is first treated in a relatively strong solution, then drained free from this brine or solution, and thereafter placed in containers and covered with another brine or weaker solution, the processing being carried out in the presence of the second weaker solution. It is desired to point out that the invention is not limited to a two-step process, but the latter is for the reason stated, the preferred form of carrying out the invention.

I have used sugars in treating crab meat to prevent discoloration, after processing, and my experiments indicate that sucrose, dextrose, and laevulose may be used. Dextrose and laevulose appear to be the most effective, and as little as 2% is effective in the present process. A larger percentage of sucrose is required. Oxidizing agents such as hydrogen peroxide, chlorates and similar compounds, either organic or inorganic, also function to prevent the formation of color in the processed crab meat. Dibasic phosphates also act to reduce the formation of blue color in the processed crab meat. In carrying out my process, I may use these compounds or similar compounds, or their chemical equivalents, themselves, or in combination, and I may use a two-stage process employing a stronger and weaker solution, or where the crab flavor is not detrimentally affected, use a single solution. However, my investigations indicate, that the best results are obtained when these compounds are used in combination with the weak organic acids or inorganic acids or salts above referred to, employing the procedure set forth.

I have also discovered that various oils have the property of reducing the coloration in processed crustaceans, particularly crab meat. Highly refined mineral oils, such as tasteless, odorless, colorless and neutral liquid hydrocarbons, have only a slight effect in reducing the coloration. Such oils are prepared from crude petroleum after the removal of the light oil. By dissolving in an oil of this character an oil soluble acid such as oleic acid, stearic acid and similar acids, the ability of the oil to reduce the formation of color in the processed crab meat is greatly increased. Utilizing large quantities of oil, the formation of color is substantially eliminated. I have also used various vegetable oils, such as cotton seed oil, corn oil, and olive oil, and find that these oils also function to reduce the formation, or entirely eliminate, the blue color in the crab meat. It appears from my experiments that the ability of oils to prevent blue coloration in crab meat after processing, is the property of its free acid. From a commercial standpoint, the objection to the use of oils as the agent functioning to remove the color-forming ingredients, or to render the same inert in crab meat after processing, is that large quantities are necessary and, therefore, they cannot be used except where a pack in oil is desired. When utilizing oxidizing agents, as previously referred to, the crustacean or crab meat is treated with a brine solution, for example, the first stock solution, and while the crab meat is in the brine, the latter is treated with the oxidizing agent, such as a chlorate or hydrogen peroxide. Instead of using these oxidizing agents, the crab meat may be blown with air or with pure oxygen, these acting as the oxidizing medium. This is the preferred method when a dry pack is desired.

The above process, as indicated, is broadly applicable to crustaceans such as crabs, shrimp, lobster, craw fish and the like, but particularly efficacious in the treatment of crab meat to produce a substantially permanent white meat. In crab meat, it appears that the coloration is not merely on the surface, but penetrates the surface deep into the meat, and it is for this reason that a special process is necessary.

In the brine solutions employed, salt is used mainly to flavor the crab meat; its effect in reducing the coloration in processed crustaceans is practically nil.

Some crustaceans such as shrimp form a coloration after processing which is chiefly on the surface and, therefore, do not require the special treatment outlined. In this case, the addition of a small amount of acid or other chemical agent will prevent the discoloration. About one-tenth of the amount used for crab meat will be sufficient.

In the case of saltwater crawfish, which inhabit chiefly the southern waters such as the coasts of Florida and Central America, the process used for crabs is necessary.

While in the above specific example, citric acid has been set forth, this is, of course, merely illustrative of any suitable agent and any suitable acid. The procedure for other agents and other acids, including those enumerated, is substantially identical and, the amounts of acid to be used in making up the brine, is based on their respective acid equivalents of their atomic weights.

One of the objects of this invention is to accomplish the prevention of the formation of the discoloration with the smallest amount of chemical possible. Large quantities of these substances adversely affect the flavor, texture and appearance of the meat.

The final product, made in accordance with the present invention, contains in its preferred form approximately one-tenth of 1% of chemical, particularly acid, which does not affect the flavor to any material extent, thereby giving the crab meat a very fine flavor.

The process outlined produces a meat free from color with a fine natural flavor, firm and natural appearing meat.

What I claim is:

1. The process of substantially eliminating the formation of color in crustaceans, comprising treating said crustaceans prior to processing with a relatively strong acid solution to extract a substantial portion of the color-forming constituents, then treating with a weaker acid solution to render the remainder of the color-forming constituents inert and processing in the presence of said weaker solution to produce a crustacean retaining its natural color, taste and texture.

2. The process of substantially eliminating the formation of color in crustaceans, comprising treating said crustaceans prior to processing with a relatively strong solution made from one of the group consisting of a mild organic acid and salts thereof to extract a substantial portion of the color-forming constituents, then treating with a weaker solution made from one of the group consisting of a mild organic acid and salts thereof to render the remainder of the color-forming constituents inert, and processing to produce a crustacean retaining its natural color, taste and texture.

3. The process of substantially eliminating the formation of color in crustaceans, comprising removing the potential color-forming ingredients therefrom by treatment with a solution made from one of the group consisting of a mild organic acid and a salt thereof and carrying an oxidizing agent.

4. The process of substantially eliminating the formation of color in crab meat comprising treating the crab meat with a relatively strong solution made from one of the group consisting of a mild organic acid and salts thereof to extract a substantial portion of the color-forming ingredients, then treating with a weaker solution to render the remainder of the color-forming constituents inert, and processing in the presence of said weaker solution to produce a crustacean retaining its natural color, taste and texture.

5. The process of substantially eliminating the formation of color in crab meat, comprising treating the crab meat with a relatively strong solution made from one of the group consisting of a mild organic acid and salts thereof to extract a substantial portion of the color-forming ingredients, then treating with a weaker boiling solution made from one of the group consisting of a mild organic acid and salts thereof to render the remainder of the color-forming constituents inert, and processing in the presence of said weaker solution to produce crab meat retaining its natural color, taste and texture.

6. The process of substantially eliminating the formation of color in crab meat, comprising treating the crab meat with a relatively strong solution made from one of the group consisting of a mild organic acid and salts thereof to extract a substantial portion of the color-forming ingredients, treating with a weaker boiling solution made from one of the group consisting of a mild organic acid and salts thereof to render the remainder of the color-forming constituents inert, processing the treated crab meat at the sterilization temperature and in the presence of said weaker solution, and quickly cooling the so-treated crab meat to produce crab meat retaining its natural color, taste and texture.

7. The process of substantially eliminating the formation of color in crab meat, comprising treating the crab meat with a relatively strong solution made from one of the group consisting of a mild organic acid and salts thereof to extract a substantial portion of the color-forming constituents, removing the extracting solution from the crab meat, treating the crab meat with a weaker solution made from one of the group consisting of a mild organic acid and salts thereof to render the remainder of the color-forming constituents inert, and thereafter processing the so-treated crab meat in the presence of said weaker solution to produce crab-meat retaining its natural color, taste and texture.

8. The process of substantially eliminating the formation of color in crustaceans comprising treating the crustacean with a relatively strong solution made from one of the group consisting of a mild organic acid and salts thereof to extract a substantial portion of the color-forming ingredients, then treating with a weaker solution made from one of the group consisting of a mild organic acid and salts thereof to render the remainder of the color-forming ingredients inert, said solutions used being of such a strength that the crustacean after processing retains its natural color, taste and texture, and processing in the presence of said weaker solution.

9. The process of substantially eliminating the formation of color in crustaceans comprising treating the crustacean with a relatively strong solution comprising one gallon of water, and one ounce of a mild organic acid to extract a substantial portion of the color-forming ingredients, then treating with a weaker solution comprising one gallon of water and one-half ounce of a mild organic acid to render the remainder of the color-forming ingredients inert, and processing in the presence of said weaker solution to produce a crustacean retaining its natural color, taste and texture.

10. The process of substantially eliminating the formation of color in crustaceans, comprising treating the crustacean with a relatively strong solution comprising one gallon of water and one ounce of citric acid to extract a substantial portion of the color-forming constituents, then treating with a weaker solution comprising one gallon of water and one-half ounce of citric acid to render the remainder of the color-forming constituents inert, and processing in the presence of said weaker solution to produce crab meat retaining its natural color, taste and texture.

DONALD W. HOWE.